Dec. 3, 1935. T. W. MILLER 2,023,026
FOUNTAIN SYRINGE
Filed March 19, 1932
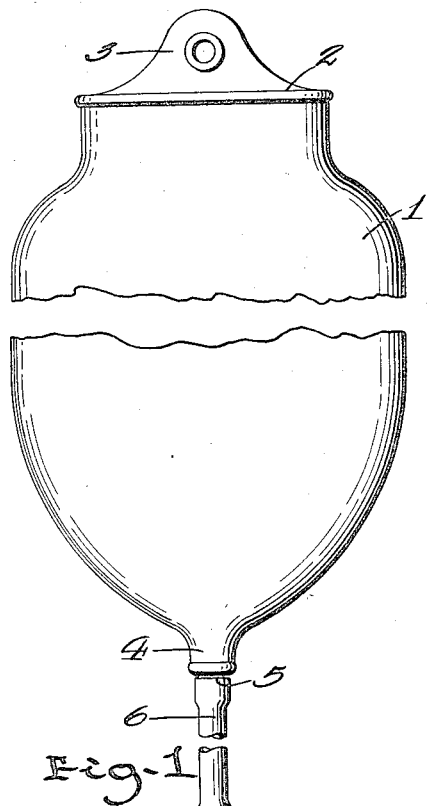
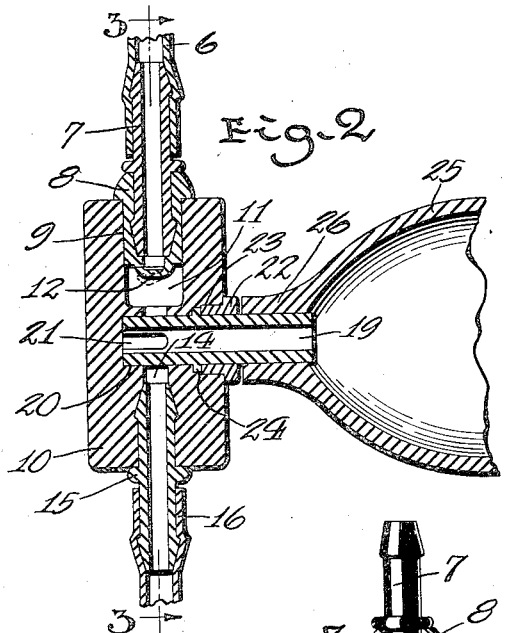
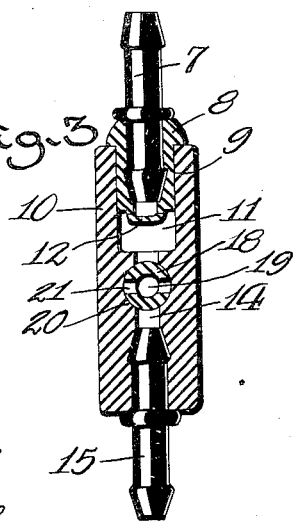
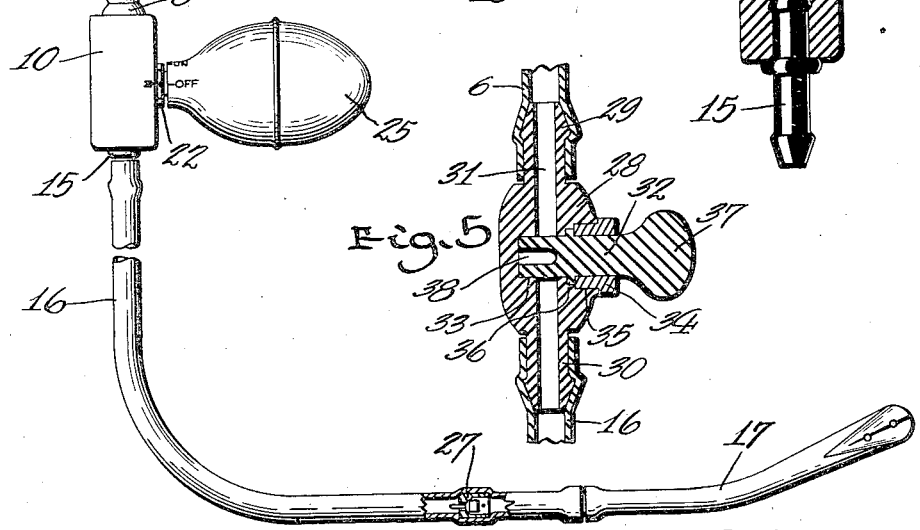
THOMAS W. MILLER
INVENTOR
BY Freeman and Weidman
ATTORNEYS Patented Dec. 3, 1935

2,023,026

UNITED STATES PATENT OFFICE 2,023,026

FOUNTAIN SYRINGE

Thomas W. Miller, Ashland, Ohio, assignor to The Faultless Rubber Company, Ashland, Ohio, a corporation of Ohio Application March 19, 1932, Serial No. 600,012

15 Claims. (Cl. 128—227)

This invention relates to fountain syringes, and the principal object of my invention is to provide a new and improved device of this type.

In the drawing accompanying this specification, and forming a part of this application, I have shown, for the purpose of illustration, two forms which my invention may assume; and in this drawing:

Figure 1 is a fragmentary elevational view, partly in section, illustrating a fountain syringe constructed in accordance with my invention, Figure 2 is an enlarged fragmentary sectional view of the valve construction shown in Figure 1, Figure 3 is a vertical longitudinal section, taken on line 3—3 of Figure 2, Figure 4 is a perspective view of the check valve for preventing the backflow of fluid, while Figure 5 is a vertical sectional view of a modified form of the invention.

Referring to the drawing, a fountain syringe constructed in accordance with my invention is shown as comprising a reservoir or receptacle 1, such as a flexible rubber bag or the like, having a filling opening 2 at its upper end, and also a perforated ear portion 3, by means of which the device may be suspended. The bag 1 is provided with a restricted portion 4 adjacent its lower end, which is adapted to frictionally embrace one end of a connecting nipple 5 of hard rubber, the lower end of which projects into the upper end of a rubber tube section 6. The lower end of the tube 6 embraces the upper end of a connecting nipple 7 of hard rubber, the lower end of which projects into a sleeve 8, of relatively soft rubber, which is cemented into a bore 9 provided in one end of a body 10 of a valve mechanism.

The body member 10 is also of relatively soft rubber, but its consistency is such as will prevent undue deformation thereof and render the same substantially self-supporting. The lower end of the sleeve 8 terminates at a point above the bottom of the bore 9 so as to provide a chamber 11, and is formed with a flap valve 12 adjacent its extreme lower end adapted to prevent the backflow of fluid through the sleeve 8 and parts communicating therewith. The flap valve 12 is preferably molded as an integral part of the sleeve 8 and is subsequently cut away partially so as to leave an integral connecting portion 13, which functions as a hinge for the valve.

The chamber 11 communicates at its lower end with a longitudinally extending passage 14 of slightly less diameter, into the lower end of which projects the upper end of a second hard rubber connecting nipple 15 adapted to project into the upper end of a lower flexible rubber tube section 16, the lower end of which is detachably connected to a suitable discharge nozzle 17.

The flow of fluid through the tube sections 6 and 16 is controlled by means of a rotary sleeve valve 18, provided with a longitudinal passage 19, which is rotatably mounted in a bore 20 provided in the body 10 and intersecting passage 14; the inner end of the valve member 18 is provided with a pair of diametrically disposed ports 21 which are adapted to be selectively moved either into registry with the passage 14 in order to establish communication between the chamber 11 and nipple 15 and the parts communicating therewith, or to a position extending transversely thereto, as shown in Figures 2 and 3, in order to interrupt such communication.

The valve member 18 is maintained against displacement by means of a shouldered sleeve 22 which surrounds the member 18 and which is cemented into a recess 23 co-axial with the bore 20 for abutting engagement with a collar 24 formed integrally on the valve member 18.

The valve member 18 may be rotated by means of a collapsible rubber bulb 25 which is provided with a neck portion 26 into which the outer end of the valve member 18 projects, and which is cemented thereto to prevent displacement.

When the valve member 18 is rotated by means of the bulb 25, so as to establish communication, the fluid will flow out of the nozzle 17 by gravity, and with a force determined by the hydrostatic head of the fluid. If, however, a greater force is desired, the bulb 25 may be compressed, thereby exerting additional pressure on the fluid in the tube 16, below the valve 18, and causing the same to emerge from the nozzle 17 with greater force. When the bulb 25 is thus compressed, the force of the air will close the flap valve 12 so as to prevent the air ejected from the bulb from escaping upwardly through the tube section 6.

As soon as pressure on the bulb 25 is removed, it will resume its normal shape and be filled with fluid flowing through the tube section 6. When the bulb 25 is again collapsed, the fluid contained therein will be expelled through the passage 19 and tube 16 and accelerate the flow of fluid therethrough. In order to prevent the backflow of fluid through the tube 16 when the bulb 25 is released, I provide a check valve 27 in the tube section 16 adjacent its lower end. This valve is normally held open under the influence of gravity to permit fluid to freely pass from the tube section 16 to the nozzle 17, but will close when suction is applied to the tube 16, by the expansion of the bulb 25.

From the foregoing, it will be apparent that I have provided a very simple and convenient device, by means of which not only may the flow of fluid through the device be quickly and easily controlled, but by means of which the force of the fluid issuing from the nozzle 17 may be increased as desired.

In Figure 5, I have shown another form of valve construction, in which the bulb 25 is dispensed with. In this construction, a body member 28 is formed with upper and lower nipple portions 29 and 30, respectively, for connection with the upper and lower tube sections 6 and 16, respectively, and a passage 31 extending longitudinally therethrough for establishing communication between the tube sections 6 and 16. The flow of fluid through the passage 31 is controlled by means of a valve member 32, which is rotatably mounted in a transversely extending bore 33, and which is maintained against displacement therefrom by means of a rubber sleeve 34. This sleeve is cemented into a recess 35 disposed co-axially with the bore 33 for abutting engagement with an annular collar 36 formed integrally on the valve member 32.

The valve member 32 is provided at its outer end with a thumb piece or handle 37, by means of which the valve may be rotated, and at its inner end with a port 38 adapted to be moved into registry with the passage 31, in order to establish fluid communication through the device. When this valve is rotated ninety degrees, to the position shown in Figure 5, communication between the sections 6 and 16 of the tube will be interrupted, thus causing a cessation of the flow of the fluid.

It will be obvious to those skilled in the art, that the embodiments of my invention herein shown and described may be variously changed, used, or modified, all without departing from the spirit of my invention or sacrificing the advantages thereof, and it therefore will be understood that the disclosures herein are illustrative only, that my invention embodies advantages and uses other than those particularly pointed out or suggested herein, and that my invention is not limited thereto.

I claim:

1. A fountain syringe, comprising: a receptacle for containing a fluid; a conduit communicating with said receptacle; a nozzle connected to said conduit; a rotary valve for controlling the flow of fluid through said conduit; a collapsible bulb for selectively rotating said valve and for increasing the flow of fluid through said conduit; a check valve disposed on one side of said rotary valve for preventing the backflow of fluid to said receptacle when said bulb is collapsed; and a check valve disposed on the other side of said rotary valve for preventing back flow of fluid through said nozzle when said bulb flexes back to its normal shape after being collapsed.

2. A fountain syringe, comprising: a receptacle for containing a fluid; a conduit communicating with said receptacle; a movably mounted valve member for controlling the flow of fluid through said conduit; and a collapsible bulb secured to said valve member for forcing additional fluid therethrough to increase the flow of fluid through said conduit, said bulb being manipulable to operate said valve member.

3. In combination, a receptacle, and a conduit communicating therewith, and a valve device controlling said conduit and comprising: a body portion of relatively stiff rubber having a passage extending therethrough; a sleeve of relatively soft rubber secured in said passage; a nipple having one end thereof projecting into said sleeve, and the other end thereof engageable with said conduit; a flap valve carried by said sleeve for preventing the backflow of fluid through said conduit; a tubular valve member rotatably mounted in said body portion for controlling the flow of fluid through said passage; and a collapsible bulb carried by said valve member for increasing the flow of fluid through said conduit and for operating said valve member.

4. A fountain syringe, comprising: a receptacle for containing fluid; a conduit communicating with said receptacle; valve means operable to control the flow of fluid through said conduit; and force means, carried by said valve means, operable to withdraw fluid from said conduit and return the same to said conduit under pressure to increase the flow of fluid through said conduit and operable to operate said valve means.

5. A fountain syringe, comprising: a receptacle for containing fluid; a conduit communicating with said receptacle; valve means, of rubber, operable to control the flow of fluid through said conduit; and a collapsible bulb, carried by said valve means, operable to withdraw fluid from said conduit through said valve means and return said fluid under pressure to force the same through said valve means to increase the flow of fluid through said conduit and manipulable to operate said valve means.

6. In combination, a receptacle; a control device having a passage therethrough, a member communicating at one end with said passage and leading to said receptacle, and a discharge member communicating with the opposite end of said passage and leading to a point of discharge, said passage and said members providing a conduit permitting gravital flow of liquid therethrough from said receptacle to the point of discharge; a force feed bulb out of line with the path of gravital flow of liquid through said conduit, communicating at one point with said passage, and operable when manipulated to draw fluid from said passage and to return said fluid under pressure through said passage and through said conduit; and valve means arranged within said passage for checking back pressure toward said receptacle when said bulb is operated to force liquid through said conduit.

7. In combination, a receptacle; a control device having a passage therethrough, a member communicating at one end with said passage and leading to said receptacle, and a discharge member communicating with the opposite end of said passage and leading to a point of discharge, said passage and said members providing a conduit permitting gravital flow of liquid therethrough from said receptacle to the point of discharge; a force feed bulb out of line with the path of gravital flow of liquid through said conduit, communicating at one point with said conduit, and operable when manipulated to draw fluid from said conduit and to return said fluid under pressure through said conduit; valve means for checking back pressure toward said receptacle when said bulb is operated to force liquid through said conduit; and additional valve means operable to control gravital flow through said conduit and to control operation of said bulb, said additional valve means being connected to said bulb, and said bulb being manipulable to operate said additional valve means.

8. In combination, a receptacle for containing fluid; a conduit communicating with said receptacle and leading to a point of discharge; said conduit providing for gravital flow of said fluid from said receptacle to said point of discharge; force means communicating with said conduit, and operable to increase the flow of said fluid therethrough; and valve means cooperable with said conduit and with said force means, said valve means being movable to one position to interrupt flow of fluid through said conduit, and movable to another position whereby gravital flow of fluid or force flow of fluid may selectively be provided.

9. In combination, a receptacle; a control device having a passage therethrough, a member communicating at one end with said passage and leading to said receptacle, and a discharge member communicating with the opposite end of said passage and leading to a point of discharge, said passage and said members providing a conduit permitting gravital flow of liquid therethrough from said receptacle to the point of discharge; a force feed bulb out of line with the path of gravital flow of liquid through said conduit, communicating at one point with said passage, and operable when manipulated to draw liquid from said passage and to return said fluid under pressure through said passage and through said conduit; valve means arranged within said passage for checking back pressure toward said receptacle when said bulb is operated to force liquid through said conduit; and valve means cooperable with said passage and operable to control gravital flow through said conduit, said valve means being movable to one position to interrupt flow of liquid through said conduit, and movable to another position whereby gravital flow of liquid or pressure flow of liquid may selectively be provided.

10. A fountain syringe, comprising: a receptacle, for containing the fluid; a conduit, leading from said receptacle to a point of discharge; valve means, cooperable with said conduit for controlling the flow of fluid through said conduit; and force means, for increasing the velocity of the fluid flowing through said conduit; said valve means and said force means being disposed so that one hand of a user may operate said valve means without removal from said force means.

11. A fountain syringe, comprising: a receptacle, for containing the fluid; a conduit, leading from said receptacle to a point of discharge; rotary valve means, cooperable with said conduit for controlling the flow of fluid through said conduit; and force means, for increasing the velocity of the fluid flowing through said conduit; said valve means and said force means being disposed so that one hand of a user may operate said valve means without removal from said force means.

12. A fountain syringe, comprising: a receptacle, for containing the fluid; a conduit, leading from said receptacle to a point of discharge; valve means having a valve port cooperable with said conduit for controlling the flow of fluid through said conduit, said valve means also having a passage communicating with said valve port; and force means, for increasing the velocity of the fluid flowing through said conduit, arranged laterally of said conduit means, and cooperable with said passage to effect communication between said conduit means and said force means; said valve means and said force means being disposed so that one hand of a user may operate said valve means without removal from said force means.

13. A fountain syringe, comprising: a receptacle, for containing the fluid; a conduit, leading from said receptacle to a point of discharge; valve means, cooperable with said conduit for controlling the flow of fluid through said conduit; and force means, for increasing the velocity of the fluid flowing through said conduit; said force means being operatively connected to said valve means to effect actuation of the same.

14. A fountain syringe, comprising: a receptacle, for containing the fluid; a conduit, leading from said receptacle to a point of discharge; rotary valve means, having a valve port cooperable with said conduit for controlling the flow of fluid through said conduit, said valve means also having a passage communicating with said valve port; and force means, for increasing the velocity of the fluid flowing through said conduit, arranged laterally of said conduit means, and cooperable with said passage to effect communication between said conduit means and said force means; said valve means and said force means being disposed so that one hand of a user may operate said valve means without removal from said force means.

15. A fountain syringe, comprising: a receptacle, for containing the fluid; a conduit, leading from said receptacle to a point of discharge; rotary valve means, cooperable with said conduit for controlling the flow of fluid through said conduit; and force means, for increasing the velocity of the fluid flowing through said conduit; said force means being cooperativley connected to said valve means to effect rotation of the same, said valve means and said force means being disposed so that one hand of a user may operate said valve means without removal from said force means.

THOMAS W. MILLER.